United States Patent
Stronks et al.

(10) Patent No.: US 9,626,046 B2
(45) Date of Patent: Apr. 18, 2017

(54) DEVICES AND METHODS FOR REDUCTION OF DISPLAY TO TOUCH CROSSTALK

(71) Applicant: APPLE INC., Cupertino, CA (US)

(72) Inventors: David A. Stronks, San Jose, CA (US); Ahmad Al-Dahle, Santa Clara, CA (US); Wei H. Yao, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 315 days.

(21) Appl. No.: 14/035,104

(22) Filed: Sep. 24, 2013

(65) Prior Publication Data
US 2015/0084911 A1 Mar. 26, 2015

(51) Int. Cl.
| | | |
|---|---|---|
| *G06F 3/044* | (2006.01) | |
| *G06F 3/041* | (2006.01) | |
| *G02F 1/1362* | (2006.01) | |
| *G09G 3/20* | (2006.01) | |
| G09G 3/36 | (2006.01) | |
| G02F 1/136 | (2006.01) | |

(52) U.S. Cl.
CPC .......... *G06F 3/044* (2013.01); *G02F 1/13624* (2013.01); *G06F 3/0412* (2013.01); *G06F 3/0416* (2013.01); *G06F 3/0418* (2013.01); *G09G 3/20* (2013.01); *G02F 2001/13606* (2013.01); *G06F 2203/04107* (2013.01); *G09G 3/3655* (2013.01); *G09G 2300/0847* (2013.01); *G09G 2320/0209* (2013.01)

(58) Field of Classification Search
CPC ...... G06F 3/0412; G06F 3/044; G06F 3/0416; G06F 3/0418; G06F 2203/04107; G09G 2300/0847; G09G 2320/0209; G09G 3/3655
See application file for complete search history.

(56) References Cited

U.S. PATENT DOCUMENTS

| | | | | |
|---|---|---|---|---|
| 4,345,248 A | * | 8/1982 | Togashi | G02F 1/13338 345/206 |
| 5,432,527 A | * | 7/1995 | Yanai | G09G 3/3648 345/87 |
| 6,407,728 B1 | * | 6/2002 | Sekine | G09G 3/3614 345/90 |

(Continued)

OTHER PUBLICATIONS

Sedra, Adel S., Microelectronic Circuits, 2nd Ed. , 1987, Holt Rinehart and Winston Inc., p. 350.*

(Continued)

*Primary Examiner* — Michael J Eurice
(74) *Attorney, Agent, or Firm* — Fletcher Yoder PC

(57) ABSTRACT

Devices and methods for reducing display-to-touch crosstalk are provided. In or more examples, an electronic display panel may include a pixel. The pixel may include a pixel electrode, a common electrode, and a first transistor having a first source coupled to a data line, a first gate coupled to a gate line, and a first drain coupled to the pixel electrode. The pixel may also include a second transistor having a second source coupled to the common electrode, a second gate coupled to the gate line, and a second drain coupled to a common voltage source. The second transistor may be configured to cause a parasitic capacitance between the gate line and the second drain of the second transistor and to reduce an effect of a parasitic capacitance between the gate line and the first drain of the first transistor.

21 Claims, 7 Drawing Sheets

(56) References Cited

U.S. PATENT DOCUMENTS

| | | | |
|---|---|---|---|
| 7,688,393 B2 | 3/2010 | Ueda et al. | |
| 7,973,870 B2 | 7/2011 | Chung et al. | |
| 8,325,286 B2 | 12/2012 | Hisada | |
| 2002/0024511 A1* | 2/2002 | Ozawa | G09G 3/2011 345/204 |
| 2004/0135773 A1* | 7/2004 | Bang | G06F 3/0421 345/173 |
| 2007/0176905 A1* | 8/2007 | Shih | G02F 1/13338 345/173 |
| 2008/0062140 A1* | 3/2008 | Hotelling | G09G 3/3648 345/173 |
| 2008/0062148 A1* | 3/2008 | Hotelling | G02F 1/13338 345/174 |
| 2008/0122783 A1* | 5/2008 | Jung | G02F 1/167 345/107 |
| 2008/0165302 A1* | 7/2008 | Yasui | G09G 3/3648 349/48 |
| 2008/0211787 A1* | 9/2008 | Nakao | G06F 3/0412 345/175 |
| 2008/0309627 A1* | 12/2008 | Hotelling | G02F 1/134363 345/173 |
| 2009/0015533 A1* | 1/2009 | Fujita | G09G 3/3655 345/92 |
| 2010/0013791 A1* | 1/2010 | Haga | G06F 3/0412 345/174 |
| 2010/0110040 A1* | 5/2010 | Kim | G06F 3/0412 345/174 |
| 2010/0134452 A1* | 6/2010 | Katoh | G01J 1/46 345/205 |
| 2010/0144391 A1* | 6/2010 | Chang | G02F 1/13338 455/566 |
| 2010/0194695 A1* | 8/2010 | Hotelling | G06F 3/0412 345/173 |
| 2010/0238134 A1* | 9/2010 | Day | G06F 3/0412 345/174 |
| 2010/0283771 A1* | 11/2010 | Lee | G02F 1/13338 345/207 |
| 2011/0025635 A1* | 2/2011 | Lee | G06F 1/3203 345/173 |
| 2011/0074705 A1* | 3/2011 | Yousefpor | G06F 3/041 345/173 |
| 2011/0096023 A1* | 4/2011 | Shih | G06F 3/0412 345/174 |
| 2011/0181560 A1* | 7/2011 | Yamazaki | H01L 27/1225 345/204 |
| 2011/0193817 A1* | 8/2011 | Byun | G06F 3/0418 345/174 |
| 2011/0210957 A1* | 9/2011 | Koyama | G06F 1/3218 345/212 |
| 2011/0216033 A1* | 9/2011 | Mamba | G06F 3/044 345/174 |
| 2011/0242050 A1* | 10/2011 | Byun | G06F 3/044 345/174 |
| 2011/0254795 A1* | 10/2011 | Chen | G06F 3/0412 345/173 |
| 2011/0298727 A1 | 12/2011 | Yousefpor et al. | |
| 2011/0298746 A1* | 12/2011 | Hotelling | G06F 3/0418 345/174 |
| 2011/0310051 A1* | 12/2011 | Souchkov | G06F 3/0416 345/174 |
| 2011/0316809 A1* | 12/2011 | Kim | G06F 3/0412 345/174 |
| 2012/0050217 A1* | 3/2012 | Noguchi | G06F 3/0412 345/174 |
| 2012/0075243 A1* | 3/2012 | Doi | G06F 3/044 345/174 |
| 2012/0120020 A1* | 5/2012 | Lee | G06F 3/0412 345/174 |
| 2012/0182251 A1 | 7/2012 | Krah | |
| 2012/0206408 A1* | 8/2012 | Brown | G06F 3/044 345/174 |
| 2012/0229421 A1* | 9/2012 | Kim | G06F 3/0412 345/174 |
| 2012/0242597 A1* | 9/2012 | Hwang | G06F 3/0412 345/173 |
| 2012/0262435 A1* | 10/2012 | Park | G06F 3/0412 345/211 |
| 2012/0268423 A1* | 10/2012 | Hotelling | G06F 3/0412 345/174 |
| 2013/0050130 A1* | 2/2013 | Brown | G06F 3/044 345/174 |
| 2013/0057511 A1* | 3/2013 | Shepelev | G06F 3/044 345/174 |
| 2013/0127752 A1* | 5/2013 | Takeuchi | G02F 1/13338 345/173 |
| 2013/0176281 A1* | 7/2013 | Hotelling | G06F 3/044 345/174 |
| 2013/0241858 A1* | 9/2013 | Hung | G06F 3/0412 345/173 |
| 2013/0249825 A1* | 9/2013 | Kang | G06F 3/03547 345/173 |
| 2014/0071360 A1* | 3/2014 | Chang | G06F 3/0412 349/12 |
| 2014/0098056 A1* | 4/2014 | Huang | G06F 3/0418 345/174 |
| 2014/0111476 A1* | 4/2014 | You | G09G 3/3655 345/174 |
| 2014/0285462 A1* | 9/2014 | Lee | G09G 3/3648 345/173 |
| 2014/0306906 A1* | 10/2014 | Huang | G06F 3/0418 345/173 |
| 2014/0354590 A1* | 12/2014 | Wang | G06F 3/044 345/174 |

OTHER PUBLICATIONS

Sedra, Adel S., Microelectronic Circuits, 2nd Ed. 1987, Holt Rinehart and Winston Inc., p. 350.*

Sedra, Adel S., et al., Microelectronic Circuits, 2nd Ed. 1987, Holt Rinehart and Winston Inc., p. 350.*

* cited by examiner

DEVICES AND METHODS FOR REDUCTION OF DISPLAY TO TOUCH CROSSTALK

BACKGROUND

The present disclosure relates generally to electronic displays and, more particularly, to reducing crosstalk in electronic displays having touch screen sensor components within display pixel cells.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices may employ a variety of user input devices, including buttons, mice, touch sensor panels, touch screens, and so forth. Touch screens, in particular, may be popular because of their ease and versatility of operation. Conventionally, touch screens may be flat panel displays such as liquid crystal displays (LCDs) or organic light emitting diode (OLED) displays overlaid with a touch panel. Such a touch screen may generally recognize the occurrence and position of touches on the screen, enabling the electronic device to respond appropriately.

Many touch screens may be formed from a capacitive touch sensor panel that is overlaid across an LCD. Such a capacitive touch sensor panel may be formed from some matrix of touch drive lines and touch sense lines. These touch drive and touch sense lines are often arranged in rows and columns on a substrate. When an object, such as a user's finger or stylus, is near an intersection of a touch drive line and a touch sense line, a capacitance between the touch drive line and touch sense line may change. This change in capacitance may indicate that a touch is occurring at this location. However, because touch screen components may be integrated into display pixel cells of the display (e.g., in-cell touch), the touch screen components may be susceptible to display-to-touch crosstalk (DTX), which may refer to a condition in which image data signals may adversely impact or distort sensed touch signals.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to devices and methods for reducing display-to-touch crosstalk. By way of example, an electronic display panel may include a pixel. The pixel may include a pixel electrode, a common electrode, and a first transistor having a first source coupled to a data line, a first gate coupled to a gate line, and a first drain coupled to the pixel electrode. The first transistor may be configured to pass a data signal from the data line to the pixel electrode upon receipt of an activation signal from the gate line. The pixel may also include a second transistor having a second source coupled to the common electrode, a second gate coupled to the gate line, and a second drain coupled to a common voltage source. The second transistor may be configured to cause a parasitic capacitance between the gate line and the second drain of the second transistor instead of between the gate line and the first drain of the first transistor.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As previously noted, embodiments of the present disclosure relate to liquid crystal displays (LCDs) and electronic devices incorporating LCDs that employ touch sensor components within display pixel cells ("in-cell"). Specifically, in-cell touch technology (e.g., in-cell touch charge sensing) may be susceptible to display to-touch crosstalk (DTX). As used herein, "display to-touch crosstalk (DTX)" may refer to a condition in which image data (e.g., data signal voltage) adversely impacts and/or distorts a sensed touch signal. DTX may often appear touch when the touch sensing signal path travels through a conductive path in which a parasitic capacitance (Cgd) may be formed between the gate and drain of, for example, a thin film transistor (TFT) supplying the image data (e.g., pixel electrode voltage) to one or more pixel electrodes. Accordingly, it may be useful to include a second active switching device (e.g., a second TFT) to control the common voltage (VCOM) on one or common electrodes to reduce the dependence of the parasitic capacitance (Cgd) on the voltage of the pixel electrodes by, for example, causing a parasitic capacitance between the gate line and the drain of the second active switching device instead of between the gate line and the drain of the TFT. In this manner, the sensed touch signal may not be distorted by the image data (e.g., pixel electrode voltage).

Figure 1:
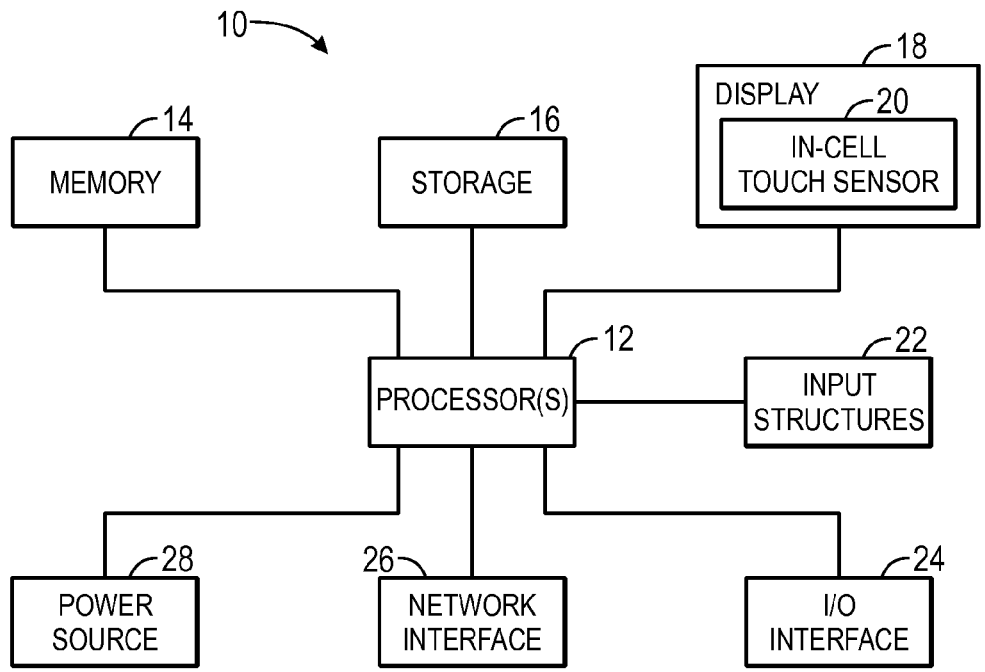
FIG. 1 is a schematic block diagram of an electronic device with a liquid crystal display (LCD) having in-cell touch sensor components, in accordance with an embodiment.
Figure 2:
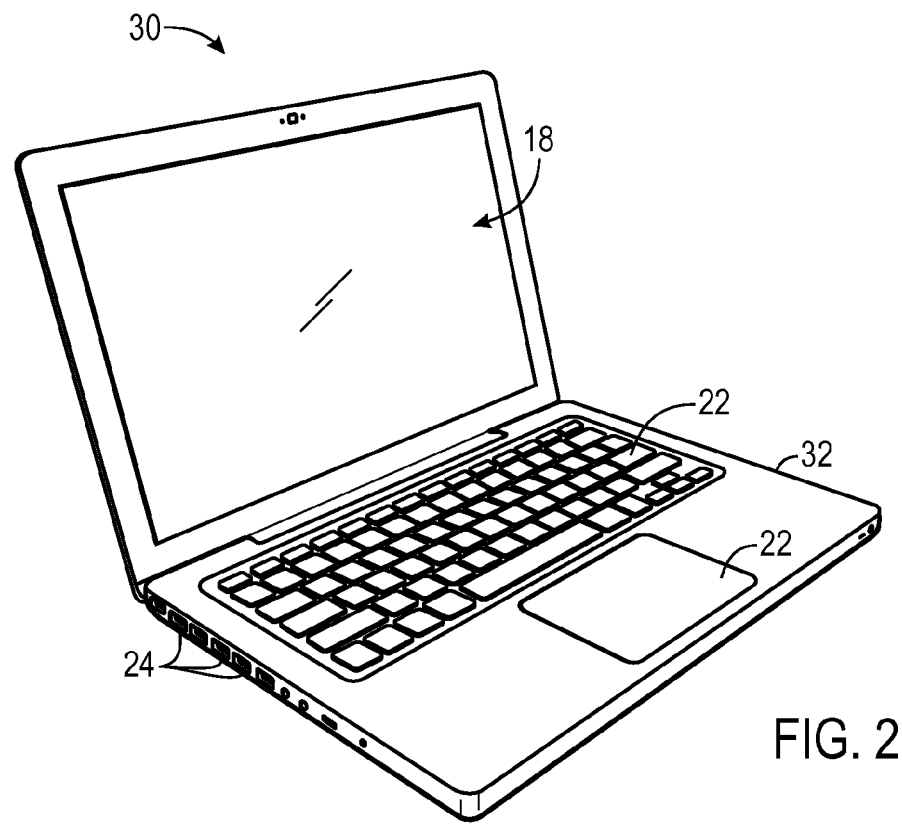
FIG. 2 is a perspective view of a notebook computer representing an embodiment of the electronic device of FIG. 1.
Figure 3:
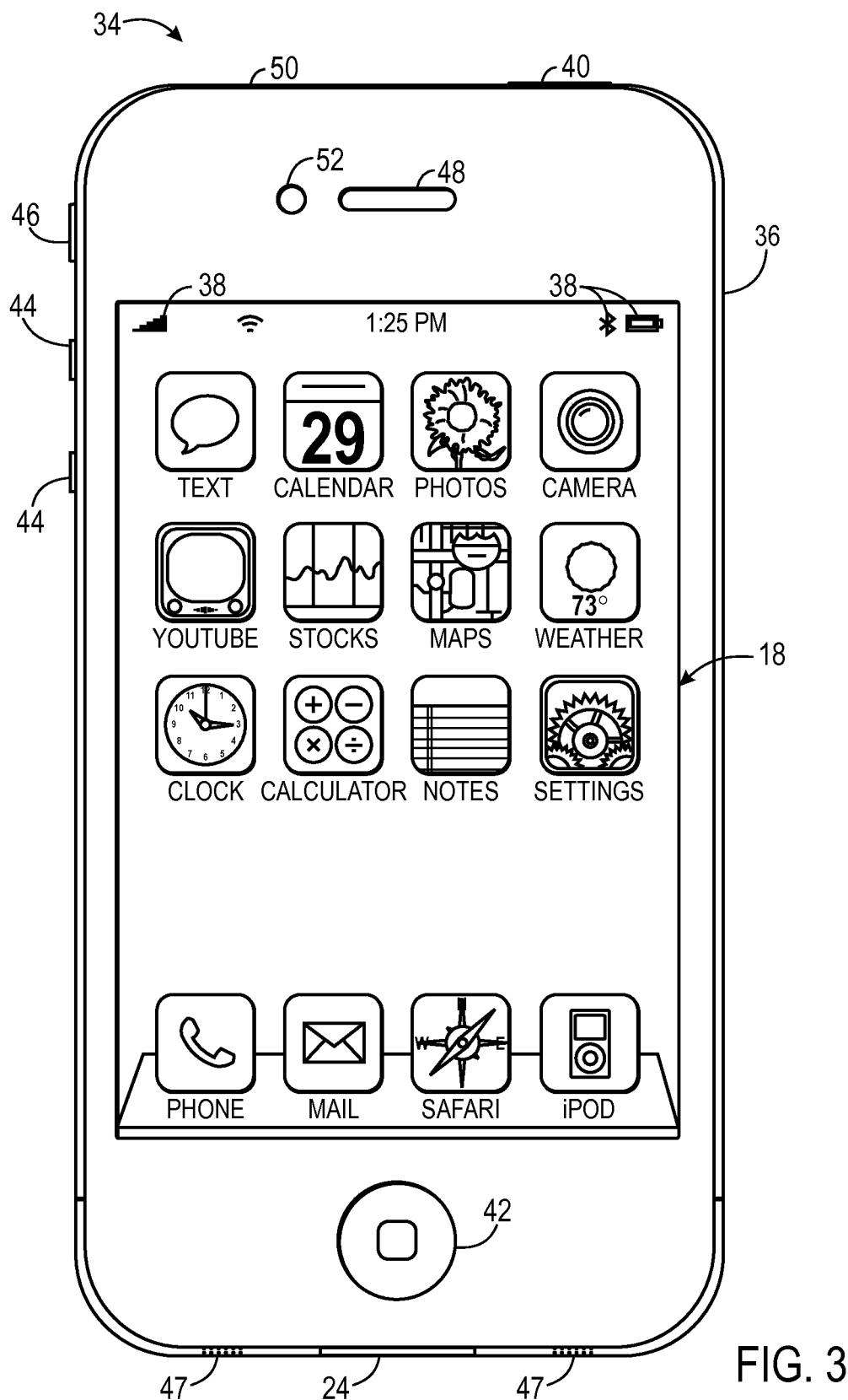
FIG. 3 is a front view of a hand-held device representing another embodiment of the electronic device of FIG. 1.

With the foregoing in mind, a general description of suitable electronic devices that may employ electronic touch screen displays having in-cell touch components and are useful in reducing display-to-touch crosstalk (DTX) will be provided below. In particular, FIG. 1 is a block diagram depicting various components that may be present in an electronic device suitable for use with such a display. FIGS. 2 and 3 respectively illustrate perspective and front views of suitable electronic device, which may be, as illustrated, a notebook computer or a handheld electronic device.

Turning first to FIG. 1, an electronic device 10 according to an embodiment of the present disclosure may include, among other things, one or more processor(s) 12, memory 14, nonvolatile storage 16, a display 18 having in-cell touch sensor components 20, input structures 22, an input/output (I/O) interface 24, network interfaces 26, and a power source 28. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in electronic device 10.

By way of example, the electronic device 10 may represent a block diagram of the notebook computer depicted in FIG. 2, the handheld device depicted in FIG. 3, or similar devices. It should be noted that the processor(s) 12 and/or other data processing circuitry may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor(s) 12 and/or other data processing circuitry may be operably coupled with the memory 14 and the nonvolatile memory 16 to perform various algorithms for responding appropriately to a user touch on the display 18. Such programs or instructions executed by the processor(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. Also, programs (e.g., an operating system) encoded on such a computer program product may also include instructions that may be executed by the processor(s) 12 to enable the electronic device 10 to provide various functionalities.

The display 18 may be a touch screen liquid crystal display (LCD), which may allow users to interact with a user interface of the electronic device 10. Various touch sensor components, such as touch sense and/or touch drive electrodes may be located within display pixel cells of the display 18. As mentioned above, in-cell touch sensor 20 components may include integrated display panel components serving a secondary role as touch sensor components. As such, it should be appreciated that the in-cell touch sensor 20 components may be formed from a gate line of the display, a pixel electrode of the display, a common electrode of the display, a source line of the display, or a drain line of the display, or some combination of these elements. In some embodiments, the in-cell touch sensor 20 may be a Multi-Touch™ display allowing multiple touches to be detected on the display 18 at once.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interfaces 26. The network interfaces 26 may include, for example, interfaces for a personal area network (PAN), such as a Bluetooth network, for a local area network (LAN), such as an 802.11x Wi-Fi network, and/or for a wide area network (WAN), such as a 3G or 4G cellular network. The power source 28 of the electronic device 10 may be any suitable source of power, such as a rechargeable lithium polymer (Li-poly) battery and/or an alternating current (AC) power converter.

The electronic device 10 may take the form of a computer or other type of electronic device. Such computers may include computers that are generally portable (such as laptop, notebook, and tablet computers) as well as computers that are generally used in one place (such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 30, is illustrated in FIG. 2 in accordance with one embodiment of the present disclosure. The depicted computer 30 may include a housing 32, a display 18, input structures 22, and ports of an I/O interface 24. In one embodiment, the input structures 22 (such as a keyboard and/or touchpad) may be used to interact with the computer 30, such as to start, control, or operate a GUI or applications running on computer 30. For example, a keyboard and/or touchpad may allow a user to navigate a user interface or application interface displayed on display 18. The display 18 may be relatively thin and/or bright, as the in-cell touch sensor 20 may not require an additional capacitive touch panel overlaid on it.

FIG. 3 depicts a front view of a handheld device 34, which represents one embodiment of the electronic device 10. The handheld device 34 may represent, for example, a portable phone, a media player, a personal data organizer, a handheld game platform, or any combination of such devices. By way of example, the handheld device 34 may be a model of an iPod® or iPhone® available from Apple Inc. of Cupertino, Calif. In other embodiments, the handheld device 34 may be a tablet-sized embodiment of the electronic device 10, which may be, for example, a model of an iPad® available from Apple Inc.

The handheld device 34 may include an enclosure 36 to protect interior components from physical damage and to shield them from electromagnetic interference. The enclosure 36 may surround the display 18, which may display indicator icons 38. The indicator icons 38 may indicate, among other things, a cellular signal strength, Bluetooth connection, and/or battery life. The I/O interfaces 24 may open through the enclosure 36 and may include, for example, a proprietary I/O port from Apple Inc. to connect to external devices.

User input structures 40, 42, 44, and 46, in combination with the display 18, may allow a user to control the handheld device 34. For example, the input structure 40 may activate or deactivate the handheld device 34, the input structure 42 may navigate user interface 20 to a home screen, a user-configurable application screen, and/or activate a voice-recognition feature of the handheld device 34, the input structures 44 may provide volume control, and the input structure 46 may toggle between vibrate and ring modes. A microphone 48 may obtain a user's voice for various voice-related features, and a speaker 50 may enable audio playback and/or certain phone capabilities. A headphone input 52 may provide a connection to external speakers and/or headphones. As mentioned above, the display 18 may be relatively thin and/or bright, as the in-cell touch sensor 20 may not require an additional capacitive touch panel overlaid on it.

Figure 4:
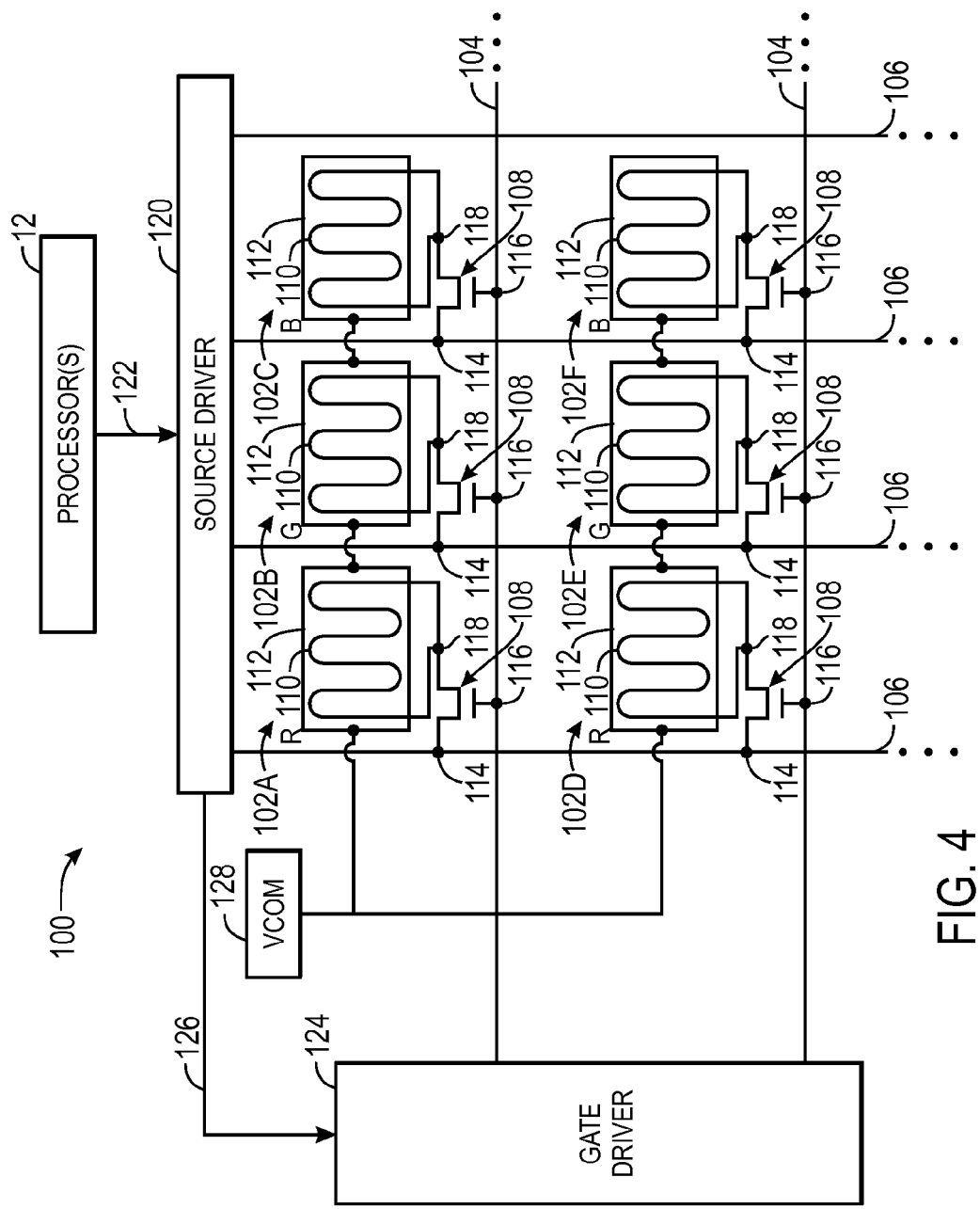
FIG. 4 is a circuit diagram of switching a display circuitry of pixels of an LCD, in accordance with an embodiment.

FIG. 4 generally represents a circuit diagram of certain components of the display 18 in accordance with some embodiments. In particular, the pixel array 100 of the display 18 may include a number of unit pixels 102 disposed in a pixel array or matrix. In such an array, each unit pixel 102 may be defined by the intersection of rows and columns, represented by gate lines 104 (also referred to as scanning lines), and source lines 106 (also referred to as data lines), respectively. Although only 6 unit pixels 102, referred to individually by the reference numbers 102a-102f, respectively, are shown for purposes of simplicity, it should be understood that in an actual implementation, each source line 106 and gate line 104 may include hundreds or thousands of such unit pixels 102. Each of the unit pixels 102 may represent one of three subpixels that respectively filters only one color (e.g., red, blue, or green) of light through, for example, a color filter. For purposes of the present disclosure, the terms "pixel," "subpixel," and "unit pixel" may be used largely interchangeably.

In the presently illustrated embodiment, each unit pixel 102 may include a thin film transistor (TFT) 108 for switching a data signal stored on a respective pixel electrode 110. The potential stored on the pixel electrode 110 relative to a potential of a common electrode 112, which may be shared by other pixels 102, may generate an electrical field sufficient to alter the arrangement of liquid crystal molecules (not illustrated in FIG. 4). In the depicted embodiment of FIG. 4, a source 114 of each TFT 108 may be electrically connected to a source line 106 and a gate 116 of each TFT 108 may be electrically connected to a gate line 104. A drain 118 of each TFT 108 may be electrically connected to a respective pixel electrode 110. Each TFT 108 may serve as a switching element that may be activated and deactivated (e.g., turned on and turned off) for a predetermined period of time based on the respective presence or absence of a scanning signal on the gate lines 104 that are applied to the gates 116 of the TFTs 108.

When activated, a TFT 108 may store the image signals received via the respective source line 106 as a charge upon its corresponding pixel electrode 110. As noted above, the image signals stored by the pixel electrode 110 may be used to generate an electrical field between the respective pixel electrode 110 and a common electrode 112. This electrical field may align the liquid crystal molecules to modulate light transmission through the pixel 102.

The display 18 also may include a source driver integrated circuit (IC) 120, which may include a chip, such as a processor or application specific integrated circuit (ASIC) that controls the display pixel array 100 by receiving image data 122 from the processor(s) 12, and sending corresponding image signals to the unit pixels 102 of the pixel array 100. The source driver 120 may also provide timing signals 126 to the gate driver 124 to facilitate the activation/deactivation of individual rows of pixels 102. In other embodiments, timing information may be provided to the gate driver 124 in some other manner. The display 18 may or may not include a common voltage (VCOM) source 128 to provide a common voltage (VCOM) voltage to the common electrodes 112. In certain embodiments, the VCOM source 128 may supply a different VCOM to different common electrodes 112 at different times. In other embodiments, the common electrodes 112 all may be maintained at the same potential or similar potential.

Figure 5:
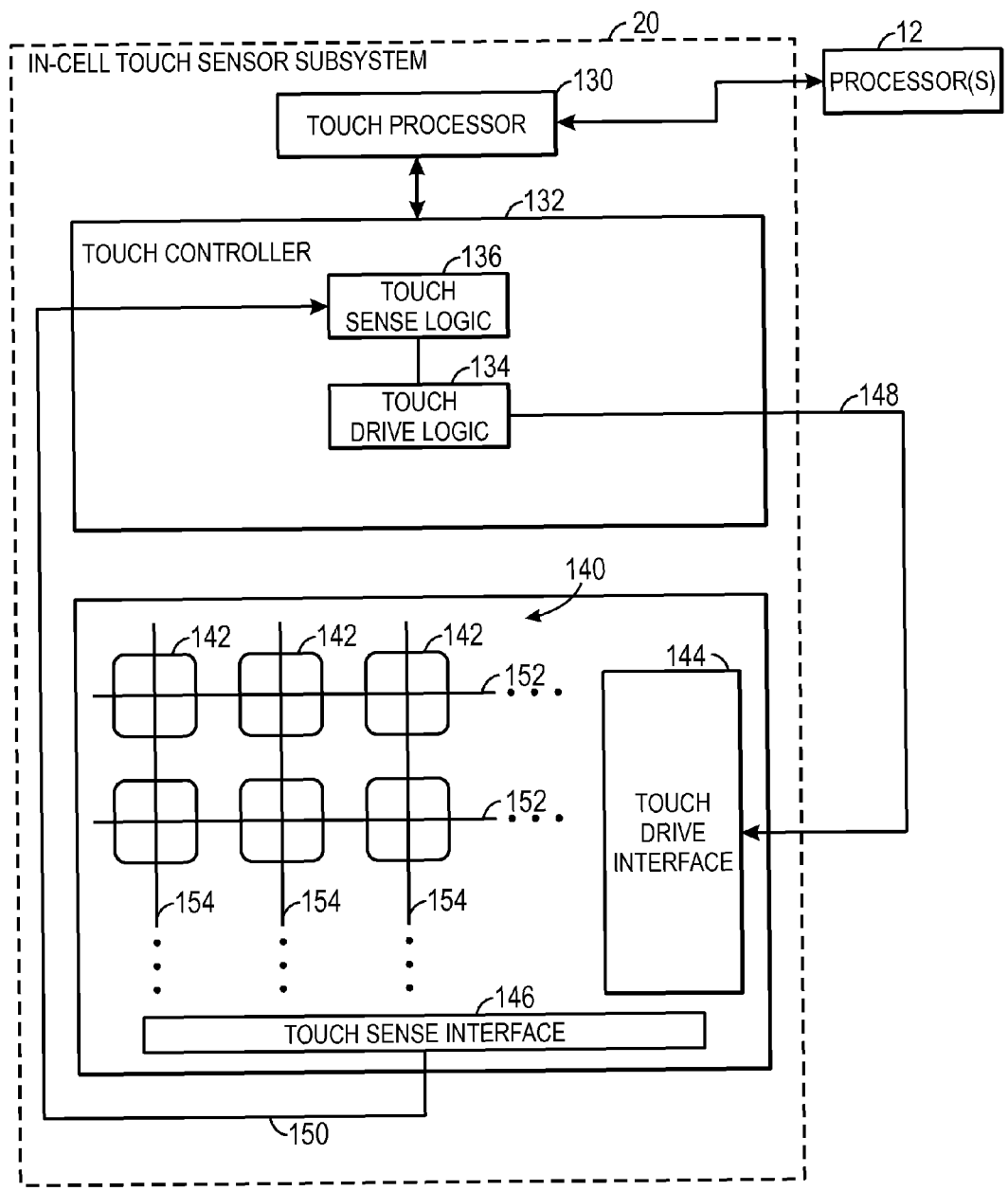
FIG. 5 is a schematic block diagram illustrating an in-cell touch sensor subsystem of an LCD, in accordance with an embodiment.

As noted above, the in-cell touch sensor 20 of the display 18 may operate using certain in-cell touch sensor components. For example, as illustrated in FIG. 5, the in-cell touch sensor 20 may interface with the processors 12 of the electronic device 10 through a touch processor 130. Specifically, the touch processor 130 may communicate the occurrence and/or position of user touches or hovers the display 18, to enable the processors 12 to appropriately respond to such user touch or hover events. As further illustrated in FIG. 5, the touch processor 130 may be operably coupled to a touch controller 132, which may control the general operation of a touch pixel array 140. As will be discussed in further detail below, the touch pixel array may include an N×M of touch pixels 142 (e.g., a 6×10 matrix or other size matrix of touch pixels 142). The touch controller 132 may include, for example, touch drive logic 134 and touch sense logic 136. The touch processor 130 may be integrated into a single application specific integrated circuit (ASIC). The touch drive logic 136 may generate and transmit touch drive signals 148 at various frequencies and/or phases to a touch drive interface 144, and a touch sense interface 146 may provide various sense signals 150 to the touch sense logic 136 in response.

As mentioned above, the touch pixel array 140 may include an M×N matrix of touch pixels 142. These touch pixels 142 arise due to interactions between touch drive electrodes 152 and touch sense electrodes 154. It should be noted that the terms "lines" and "electrodes" as sometimes used herein simply refers to conductive pathways, and is not intended to be limited to structures that are strictly linear. Rather, the terms "lines" and "electrodes" may encompass pathways that change direction, of different size, shape, materials, and regions. The touch drive electrodes 152 may be driven by touch drive signals 148 from the touch drive logic 134 of the touch controller 132.

The sense lines 154 may respond differently to the touch drive signals 148 when an object, such as a finger, is located near the confluence of a given touch drive electrode 152 and a given touch sense electrode 154. The presence of the object may be "seen" by the touch pixel 142 that may result at an intersection of the touch drive electrode 152 and the touch sense electrode 154. That is, the touch drive electrodes 152 and the touch sense electrodes 154 may form capacitive sensing nodes, or more aptly, the touch pixels 142. It should be appreciated that the respective touch drive electrodes 152 and touch sense electrodes 154 may be formed, for example, from dedicated touch drive electrodes 152 and/or dedicated touch sense electrodes 154, and/or may be formed from one or more gate lines 104 of the display 18, one or more pixel electrode 110s of the display 18, one or more common electrodes 112 of the display 18, or some combination of these elements.

Figure 6:
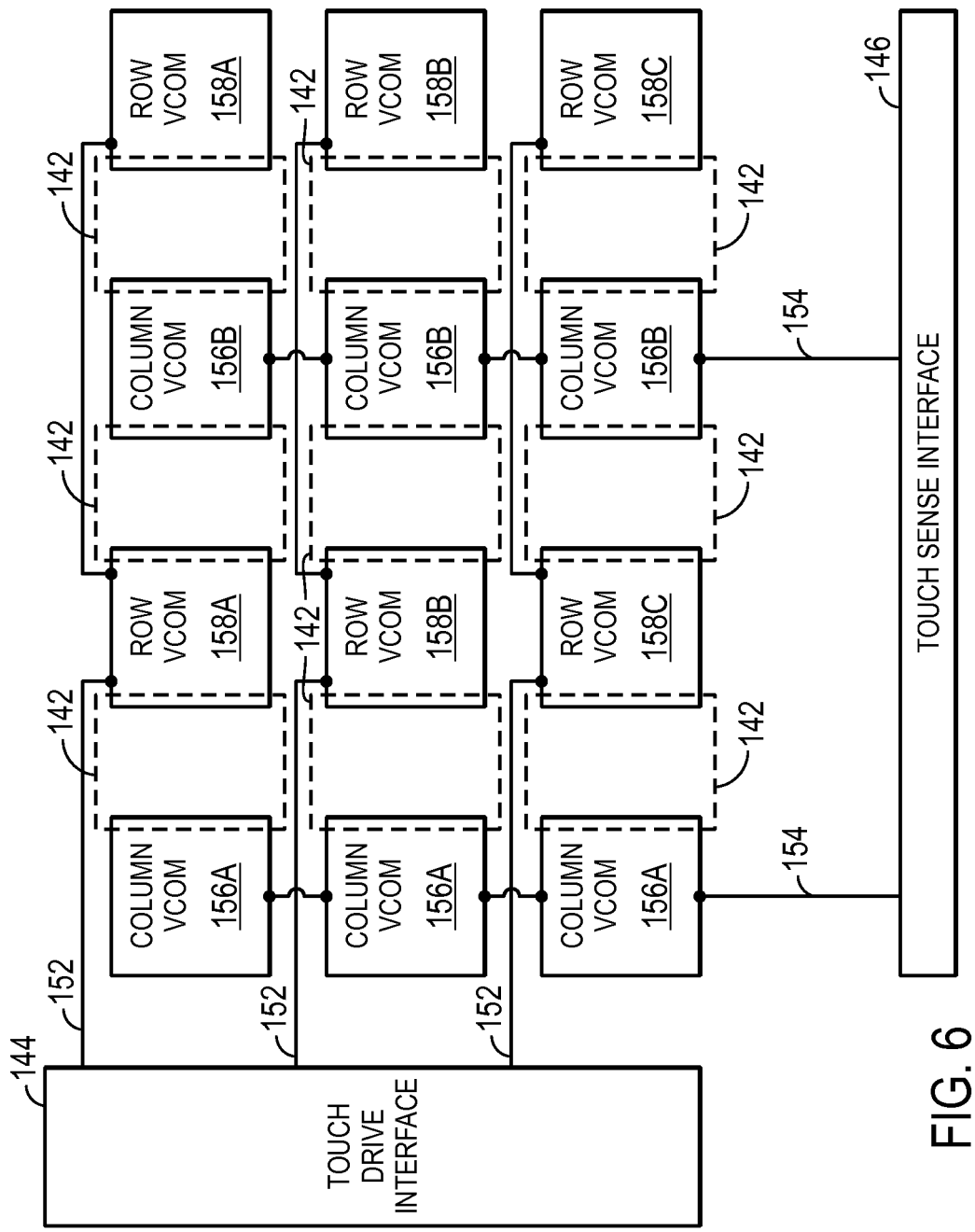
FIG. 6 is a schematic block diagram of the multiple VCOMs of the LCD, in accordance with an embodiment.

For example, as illustrated in FIG. 6, the touch drive electrodes 152 and touch sense electrodes 154 may include column VCOM 156 electrodes and row VCOM 158 electrodes. Specifically, although FIG. 6 depicts only two column VCOMs 156A and 156B and two row VCOMs 158, an actual implementation of the display 18 may include any suitable number of column VCOMs 156 and row VCOMs 158. As previously noted, the column VCOMs 156 and row VCOMs 158 may gather touch sense information when operating in what may be referred to herein as a touch mode of operation. Though the column VCOMs 156 and row VCOMs 158 may be supplied the same direct current (DC) bias voltage, for example, in some embodiments, different alternating current (AC) voltages may be supplied and/or received on VCOMs 156 and 158 at substantially different times. For example, as previously noted, the display 18 may be configured to switch between two modes of operation: a display mode of operation and the touch mode of operation.

In the display mode, the column VCOMs 156 and the row VCOMs 158 may operate in the aforementioned manner, in which an electric field is generated between the column and row VCOMs 156 and 158 and respective pixel electrodes 110. The electric field may modulate the liquid crystal molecules to allow a certain amount of light to pass through the pixel. Thus, an image may be displayed on the display 18 in the display mode. On the other hand, in the touch mode, the row VCOM 158 and the column VCOM 156 may be configured to sense a touch on the display 18. In certain embodiments, a stimulus signal or voltage may be provided by the row VCOM 158. The column VCOM 156 may receive a touch signal and output the data to be processed, for example, by the touch processor 130 and/or the processor (s) 12. The touch signal may be generated when a user, for example, touches and/or hover a finger nearby the display 18, creating capacitive coupling with a portion of the row VCOM 158 and a portion of the column VCOM 156. Thus, the portion of the column VCOM 156 may receive a signal indicative of the touch and/or hover.

Figure 7:
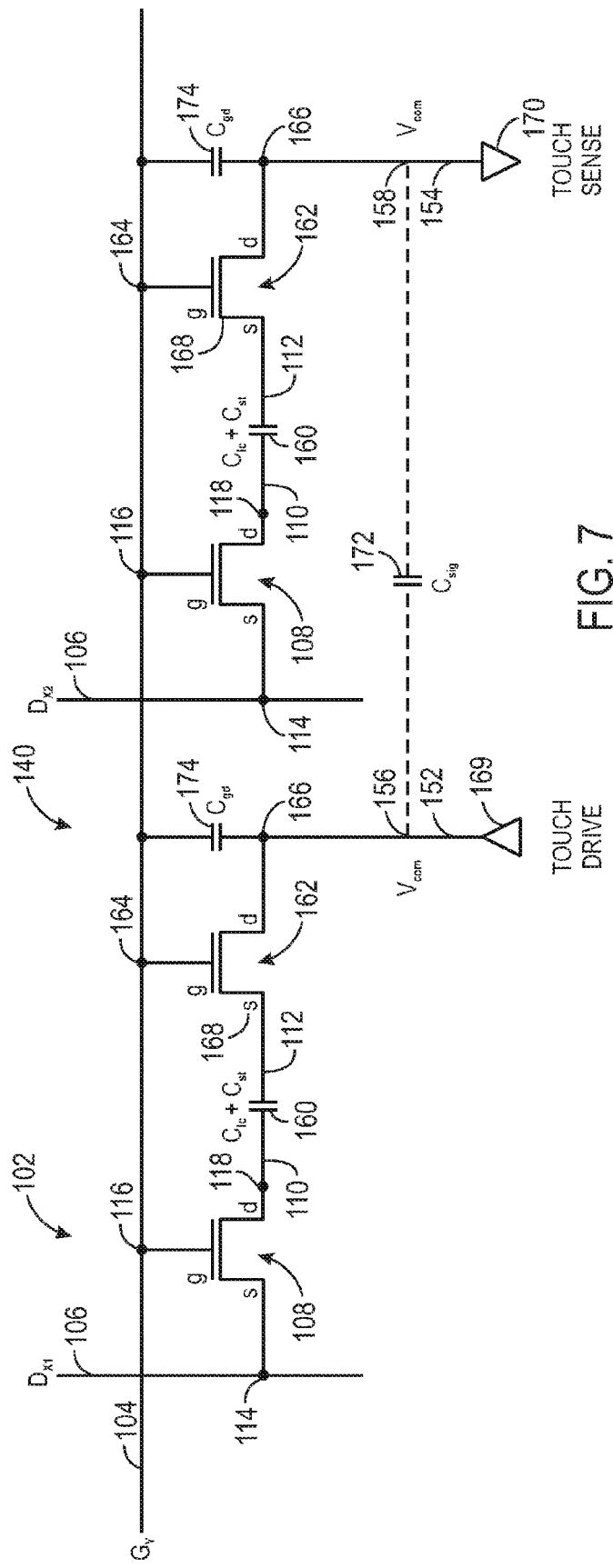
FIG. 7 is a circuit diagram of one or more pixels of an LCD, in accordance with an embodiment.

Turning now to FIG. 7, which illustrates an embodiment of a circuit diagram (e.g., equivalent circuit) of one or more display pixels 102 and touch pixels 142 included within, for example, the touch drive regions (e.g., across the row VCOMs 158) and touch sense regions (e.g., along the column VCOMs 158) of the display 18. As depicted, the pixels 102 may include TFTs 108, as previously discussed above with respect to FIGS. 4 and 5. The respective sources 114 of the TFTs 108 may be electrically connected to respective source lines ($D_{x1}$) and ($D_{x2}$) 106, and the gates 116 of the TFTs 108 may be electrically connected to the gate line ($G_y$) 104. Further, the drains 118 of the TFTs 108 may be electrically connected to respective pixel electrodes 110. As further illustrated, liquid crystal capacitances ($C_{LC}$) 160 and/or storage capacitances ($C_{ST}$) 160 may be present between the respective pixel electrodes 110 and the common electrodes 112.

During the display mode of operation, data signals may be supplied to the source lines ($D_{x1}$) and ($D_{x2}$) 106 and by extension, to the respective sources 114 of the TFTs 108. Similarly, an activation signal may be supplied to the gate line ($G_y$) 104 to activate the gates 116 of the TFTs 108. With the TFTs 108 activated, the data signals supplied to the respective sources 114 flow through the TFTs 108 to the respective drains 118. Thus, the data signal may be supplied to the pixel electrodes 110. Specifically, to store the data signals onto the pixel electrodes 110, the activation signal may be removed from the gate line ($G_y$) 104 while the data signals are still being supplied to the source lines ($D_{x1}$) and ($D_{x2}$) 106. However, when the activation signal is removed, a portion of the voltage stored by the pixel electrodes 110 may, in some embodiments, contribute to a parasitic capacitance ($C_{gd}$) (not illustrated) that may be formed between the gates 116 and the drains 118. In one embodiment, the parasitic capacitance ($C_{gd}$) may be a function (e.g., nonlinear function) of the voltage levels (e.g., white and black color levels) of the data signals being supplied to the source lines ($D_{x1}$) and ($D_{x2}$) 106. In the touch mode of operation, if the parasitic capacitance ($C_{gd}$) is left to persist, crosstalk (e.g., display image-dependent and/or data signal-dependent interference) may be introduced between, for example, the display pixels 102 and the touch pixels 142 illustrated in FIG. 5. That is, a parasitic capacitance ($C_{gd}$) may be formed, for example, in one or more coupling paths of the drive signals 148 and/or the sense signals 150, and may thus adversely impact or distort the drive signals 148 and/or the sense signals 150 (e.g., create an image of a phantom touch or otherwise an undetectable image of a touch).

In certain embodiments, one or more active switches 162 may be included between each of the column VCOMs 156 and the row VCOMs 158 and respective common electrodes 112. Indeed, the one or more active switches 162 may be provided to reduce the dependence of parasitic capacitance ($C_{gd}$) on the voltage of the pixel electrodes 110, such that any distortion (e.g., image data related) to the drive signals 148 and/or the sense signals 150 may be substantially reduced. The active switches 162 may include any active switching devices (e.g., one or more specific transistors, or other solid-state switching devices) useful in controlling the common voltage signal (VCOM) delivered to the common electrode 112, and by extension, the charge on the common electrodes 112. For example, during the display mode, an activation signal may be supplied to the gate line ($G_y$) 104 to activate a gate 164 of the active switch 162 (e.g., switch to an "ON" state), thus allowing the VCOM signals to pass from drains 166 of the active switches 162 to respective sources 168 coupled to the common electrodes 112. As it should be appreciated, during the display mode, the TFTs 108 may be activated at substantially the same time to allow image data to be stored on the pixel electrodes 110.

On the other hand, as further illustrated in FIG. 7, during the touch mode, the activation signal may be removed from the active switches 162 (e.g., switch to an "OFF" state), causing, for example, a high impedance or floating charge on the common electrodes 112. During this period of time, touch drive signals 148 generated, for example, by a touch drive amplifier 169 may emanate from the VCOM 156 and generate a touch signal capacitance ($C_{SIG}$) 172. The touch signal capacitance ($C_{SIG}$) 172 may be indicative a user touch or hover. The touch signal capacitance ($C_{SIG}$) 172, or a change thereof (e.g., the indication of the touch or hover), may be then sensed by the VCOM 158 and amplified by a touch sense amplifier 170.

Furthermore, in certain embodiments, a portion of the touch drive signal 148 emanating from the VCOM 156 may charge the parasitic capacitance ($C_{gd}$) 174 formed between the respective drains 166 of the active switches 162, creating, for example, a secondary touch signal path to the touch sense amplifier 170. Similarly, a touch signal 150 sensed by the VCOM 158 may pass through a corresponding parasitic capacitance ($C_{gd}$) 174 being amplified by the touch sense amplifier 170. In this way, the dependence of the parasitic capacitance ($C_{gd}$) 174 on, for example, the voltage of the pixel electrodes 110 may be substantially reduced. Instead, the parasitic capacitance ($C_{gd}$) 174 may be charged by the voltage of the touch drive signals 148 emanating from the VCOM 156. Thus, whether the touch drive signals 148 are detected as a change in signal capacitance ($C_{SIG}$) 172, or the touch drive signals 148 alternatively travels a conductive path through the parasitic capacitances ($C_{gd}$) 174, the touch drive signals 148 and/or the touch sense signals 150 may be substantially unmitigated by the voltage of the pixel electrodes 110 (e.g., the voltage between the drains 118 of the respective TFTs 108 and the gate line ($G_y$) 104).

Figure 8:
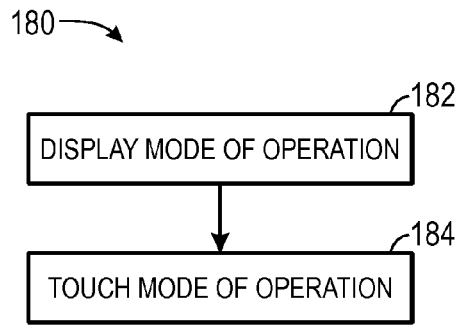
FIG. 8 is a flowchart describing a display mode of operation and a touch mode of operation of an LCD, in accordance with an embodiment.
Figure 9:
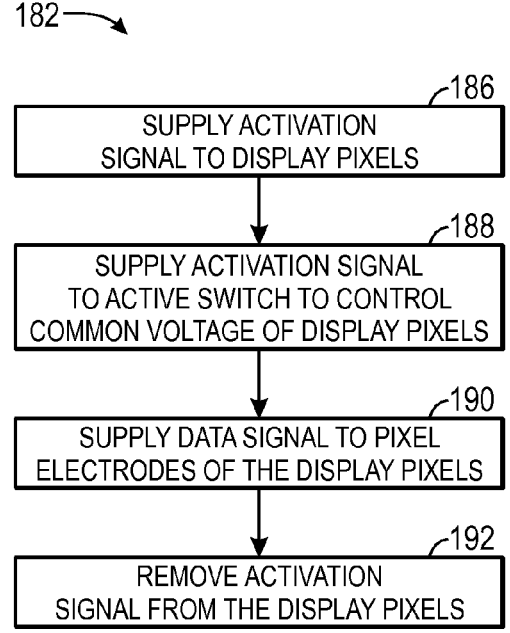
FIG. 9 is a flowchart illustrating an embodiment of a process suitable for reducing display-to-touch crosstalk when operating the LCD of FIG. 8 in the display mode of operation, in accordance with an embodiment.
Figure 10:
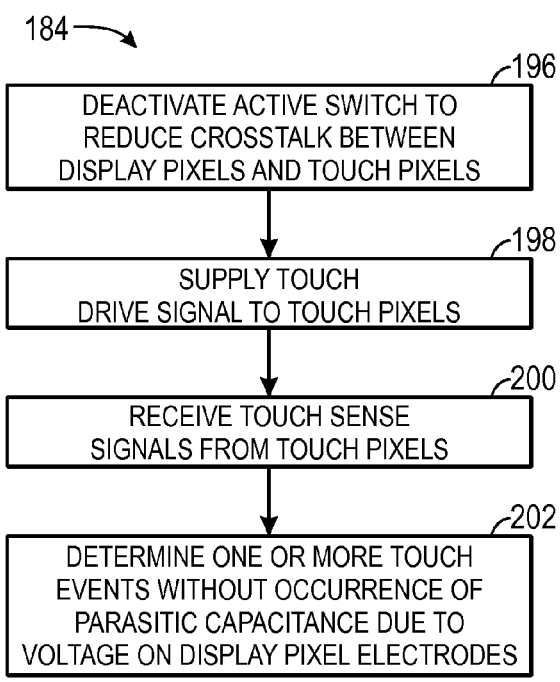
FIG. 10 is a flowchart illustrating an embodiment of a process suitable for reducing display-to-touch crosstalk when operating the LCD of FIG. 8 in the touch mode of operation, in accordance with an embodiment.

Turning now to FIGS. 8, 9, and 10, flow diagrams are presented, illustrating embodiments of a process 180 (e.g., display mode process 182 and touch mode process 184) useful in reducing display-to-touch crosstalk (DTX) by using, for example, the one or more processor(s) 12 included within the system 10 depicted in FIG. 1. For the purpose of illustration, henceforth, FIG. 8 may be discussed in conjunction with FIGS. 9 and 10. The process 180 may include code or instructions stored in a non-transitory machine-readable medium (e.g., the memory 14) and executed, for example, by the one or more processor(s) 12 included within the system 10. As previously noted, the system 10 may operate in each of a display mode operation (block 182) and a touch mode of operation (block 184). In the display mode, operation may begin with supplying (block 186) an activation signal to the display pixels 102 (e.g., via the gate line 104). Operation in the display mode 182 may continue with supplying (block 188) an activation signal to the active switches 162 (e.g., via the gate line 104). For example, as noted above with respect to FIG. 7, the active switches 162 may be included between each of the column VCOMs 156 and the row VCOMs 158 and respective common electrodes 112, and may be useful in controlling the common voltage signal (VCOM) delivered to the common electrode 112, and by extension, the charge on the common electrodes 112 of the display pixels 102.

Operation in the display mode 182 may then continue with supplying (block 190) a data signal to the pixel electrodes 110 of the display pixels 102 (e.g., via the drains 118 of the pixels 102) to store image data onto the pixel electrodes 110. Operation in the display mode 182 may then conclude with removing (block 192) the activation signals from the display pixels. In a similar manner, FIG. 10 illustrates the touch mode 184. It should be appreciated that the display mode 182 and the touch mode 184 may be operable substantially concurrently with respect to each other, substantially sequentially with respect to each other, substantially interdependently, or otherwise operable in some combination thereof. Considering the foregoing, operation in the touch mode 184 may begin with deactivating (block 196) the active switches 162. Specifically, the active switches 162 controlling the common voltage signal (VCOM) delivered to the common electrodes 112 may be deactivated to reduce the possibility of crosstalk between, for example, the display pixels 102 and touch pixels 140.

Operation in the touch mode 184 may continue with supplying (block 198) touch drive signals (e.g., stimulation signals) to the touch pixels 140. As noted above with respect to FIG. 7, a portion of the touch drive signals emanating from, for example, the VCOM 156 may charge a parasitic capacitance ($C_{gd}$) 174 formed between the respective drains 166 of the active switches 162 and the gate line ($G_y$) 104 during the period of time the active switches 162 is switched to the "OFF" state. Operation in the touch mode 184 may then continue with receiving (block 200) touch sense signals from the touch pixels 140. Operation in the touch mode 184 may then conclude with determining (block 202) one or more touch and/or hover events without an occurrence of a parasitic capacitance ($C_{gd}$) due to the voltage level of the display pixel electrodes 110. In other words, dependence of the parasitic capacitance ($C_{gd}$) 174 on, for example, the voltage of the pixel electrodes 110 may be reduced, and by extension, the possibility of crosstalk between the display pixels 102 and touch pixels 140 may be reduced.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:
1. A display panel, comprising:
   a unit pixel, including:
      a unit pixel electrode;
      a first common electrode;
      a first transistor having a first source coupled to a data line, a first gate coupled to a gate line, and a first drain coupled to the unit pixel electrode, wherein the first transistor is configured to pass a data signal from the data line to the unit pixel electrode upon receipt of an activation signal from the gate line; and
      a second transistor having a second source coupled to the first common electrode, a second gate coupled to the gate line, and a second drain coupled to a common voltage source, wherein the second transistor is configured to cause a parasitic capacitance between the gate line and the second drain of the second transistor and to reduce an effect of a parasitic capacitance between the gate line and the first drain of the first transistor;

wherein the first common electrode of the unit pixel is configured to operate, while in a touch mode, as a touch sense electrode that detects a touch capacitance formed between the first common electrode and a second common electrode of another unit pixel, wherein the second common electrode is configured to operate, in the touch mode, as a touch drive electrode, wherein the touch capacitance is indicative of a touch or hover over the display panel.

2. The display panel of claim 1, wherein the first transistor is configured to pass displayable image data as the data signal to the unit pixel electrode.

3. The display panel of claim 1, wherein the second transistor is configured to receive a control signal to switch between one of an activated state or a deactivated state to control a voltage on the first common electrode, and wherein, in the deactivated state, the second drain of the second transistor is configured to allow the common voltage signal to charge the parasitic capacitance.

4. The display panel of claim 1, comprising a third transistor, wherein the first common electrode is communicatively coupled to the second drain of the second transistor and the second common electrode is communicatively coupled to a third drain of the third transistor, and wherein the parasitic capacitance is formed along a conductive path between the first common electrode and the second common electrode.

5. The display panel of claim 1, wherein the second transistor is configured to transmit a common voltage signal to the first common electrode upon receipt of a second activation signal from the gate line, and wherein the second transistor is configured to not transmit the common voltage signal when deactivated.

6. The display panel of claim 5, wherein, in a display mode, the second transistor is configured to transmit the common voltage signal to the first common electrode at substantially the same time the first transistor is configured to pass the data signal to the unit pixel electrode.

7. The display panel of claim 5, wherein, in a touch mode, the first transistor and the second transistor are configured to deactivate, during which time the display panel is configured to detect one or more touches or hovers on the display panel.

8. An electronic device, comprising:
a liquid crystal display (LCD) panel comprising a plurality of unit pixels, wherein each of the plurality of unit pixels comprises a first transistor, a second transistor, and a unit pixel electrode formed there between;
a gate driver configured to transmit a signal to switch the first transistor and the second transistor to one of an activated state or a deactivated state, wherein, in the activated state, the first transistor is configured to supply image data to the unit pixel electrode; and
a touch controller configured to generate a touch drive signal to stimulate one or more touch drive voltage common (VCOM) electrodes and to receive a touch sense signal from one or more touch sense VCOM electrodes as an indication of a touch or hover of the LCD, wherein the second transistor is configured to substantially reduce an effect of a capacitive coupling between the unit pixel electrode and the touch drive signal or between the unit pixel electrode and the touch sense signal, and wherein the touch sense signal is configured to vary based on a touch capacitance formed between the one or more touch drive VCOM electrodes and the one or more touch sense VCOM electrodes.

9. The electronic device of claim 8, wherein the plurality of unit pixels comprises an array of display pixels.

10. The electronic device of claim 8, wherein the plurality of unit pixels comprises an array of touch pixels.

11. The electronic device of claim 8, wherein the gate driver is configured to transmit the signal to switch the first transistor and the second transistor to the deactivated state, and wherein the touch controller is configured to generate the touch drive signal to stimulate the one or more touch drive VCOM electrodes when the first transistor and the second transistor are each in the deactivated state.

12. The electronic device of claim 8, wherein a change in the capacitance comprises an indication of the touch or hover of the LCD.

13. The electronic device of claim 8, wherein, in the activated state, the second transistor is configured to pass a common voltage signal to a common electrode formed between the first transistor and the second transistor, wherein the unit pixel electrode and the common electrode are configured to form a liquid crystal capacitance.

14. A method of reducing display-to-touch crosstalk, comprising:
in a display mode of operation:
supplying an activation signal to a first active switching device of a display pixel of an electronic display, wherein the first active switching device is configured to control a data signal supplied to a unit pixel electrode of the display pixel;
supplying an activation signal to a second active switching device of the display pixel, wherein the second active switching device is configured to control a common voltage signal supplied to a common electrode of the display pixel; and
in a touch mode of operation:
deactivating the second active switching device, wherein deactivating the second active switching device comprises substantially reducing an effect of an occurrence of a parasitic capacitance between a gate line of the display pixel and a first common voltage (VCOM) electrode used in touch sensing in the electronic display; and
supplying a touch drive signal to the touch pixel to stimulate the touch pixel.

15. The method of claim 14, wherein supplying the activation signal to the first active switching device comprises activating the first active switching device to store image data to the unit pixel electrode.

16. The method of claim 14, wherein deactivating the second active switching device comprises deactivating the second active switching following a period of time in which the data signal is supplied to the unit pixel electrode.

17. The method of claim 14, wherein deactivating the second active switching) The method of claim 14, wherein reducing the occurrence of the parasitic capacitance between the display pixel and the touch pixel comprises reducing a dependence of the parasitic capacitance on a voltage of the unit pixel electrode.

18. The method of claim 14, comprising:
receiving a touch sense signal from the touch pixel; and
determining a touch or hover of the electronic display based on the received touch sense signal, wherein a touch drive signal and the touch sense signal are substantially unmitigated by the parasitic capacitance.

19. An electronic device, comprising:
a first thin-film transistor (TFT) of a unit pixel, wherein the first TFT comprises a first source, a first gate, and a first drain, wherein the first TFT is configured to transmit an image data signal from the first source to the first drain;

a second TFT of the unit pixel, wherein the second TFT comprises a second source, a second gate, and a second drain, wherein the second TFT is configured to transmit a common voltage signal from the second drain to the second source, wherein the first TFT is communicatively coupled to the second TFT, and wherein the first drain of the first TFT and the second source of the second TFT are configured to form a liquid crystal capacitance therebetween to store image data thereto; and a row common voltage (VCOM) electrode and a column common voltage (VCOM) electrode coupled to the first TFT and the second TFT, wherein a touch capacitance is formed along a first conductive path between row VCOM electrode and the column VCOM electrode, and wherein a parasitic capacitance is formed along a second conductive path between row VCOM electrode and the column VCOM electrode to reduce any effect of another parasitic capacitance that may form along the first conductive path.

20. The electronic device of claim 19, wherein the second TFT is configured such that the common voltage signal on the second drain of the second TFT charges the parasitic capacitance in lieu of the image data signal on the first drain of the first TFT.

21. The electronic device of claim 19, wherein the touch capacitance is configured to provide an indication of a touch or hover of a display of the electronic device.

\* \* \* \* \*